United States Patent [19]
Abe et al.

[11] Patent Number: 5,815,323
[45] Date of Patent: Sep. 29, 1998

[54] FAST ASPHERICAL ZOOM LENS SYSTEM

[75] Inventors: Tetsuya Abe, Sapporo Hokkaido; Takayuki Ito; Takashi Enomoto, both of Tokyo, all of Japan

[73] Assignee: Asahi Kogaku Kogyo Kabushiki Kaisha, Tokyo, Japan

[21] Appl. No.: 907,413

[22] Filed: Aug. 7, 1997

[30] Foreign Application Priority Data

Aug. 12, 1996 [JP] Japan .................................. 8-212653

[51] Int. Cl.⁶ ........................... G02B 15/14; G02B 13/18
[52] U.S. Cl. ........................................... 359/688; 359/708
[58] Field of Search ................................. 359/688, 708, 359/683, 676

[56] References Cited

U.S. PATENT DOCUMENTS

| | | | |
|---|---|---|---|
| 4,390,248 | 6/1983 | Ikemori | 359/688 |
| 4,490,017 | 12/1984 | Okudaira et al. | 359/688 |
| 4,491,395 | 1/1985 | Okudaira | 359/688 |
| 4,572,620 | 2/1986 | Kikuchi | 359/688 |
| 4,653,874 | 3/1987 | Takahashi et al. | 359/688 |
| 4,659,187 | 4/1987 | Tsuji et al. | 359/688 |
| 4,749,267 | 6/1988 | Mihara | 359/688 |
| 4,934,796 | 6/1990 | Sugiura et al. | 359/683 |
| 4,948,234 | 8/1990 | Mihara | 359/688 |
| 4,948,239 | 8/1990 | Estelle | 359/688 |
| 5,050,972 | 9/1991 | Mukaiya et al. | 359/683 |
| 5,221,995 | 6/1993 | Yaneyama | 359/688 |
| 5,282,089 | 1/1994 | Abe | 359/688 |
| 5,579,168 | 11/1996 | Aoki | 359/688 |
| 5,579,172 | 11/1996 | Aoki et al. | 359/688 |
| 5,583,700 | 12/1996 | Usui et al. | 359/688 |

FOREIGN PATENT DOCUMENTS

| | | |
|---|---|---|
| 1064323 | 4/1967 | United Kingdom . |
| 1066501 | 4/1967 | United Kingdom . |
| 1109912 | 4/1968 | United Kingdom . |
| 1109913 | 4/1968 | United Kingdom . |

*Primary Examiner*—Scott J. Sugarman
*Attorney, Agent, or Firm*—Grenblum & Bernstein, P.L.C.

[57] ABSTRACT

A fast aspherical zoom lens system includes a positive first lens group, a negative second lens group, a negative third lens group, and a positive fourth lens group, arranged in this order from the object side. The lens system includes at least one aspherical surface. When the zooming operation is carried out, the second and third lens groups are moved. The aspherical surface is located at a position in which the following condition is satisfied:

$$H_{ASP}/H_{MAX}<0.35,$$

wherein $H_{MAX}$ represents the height of the paraxial ray furthest from the optical axis at the long focal length extremity for all the lens surfaces, and $H_{ASP}$ represents the height of the paraxial ray to the aspherical surface at the long focal length extremity.

3 Claims, 7 Drawing Sheets

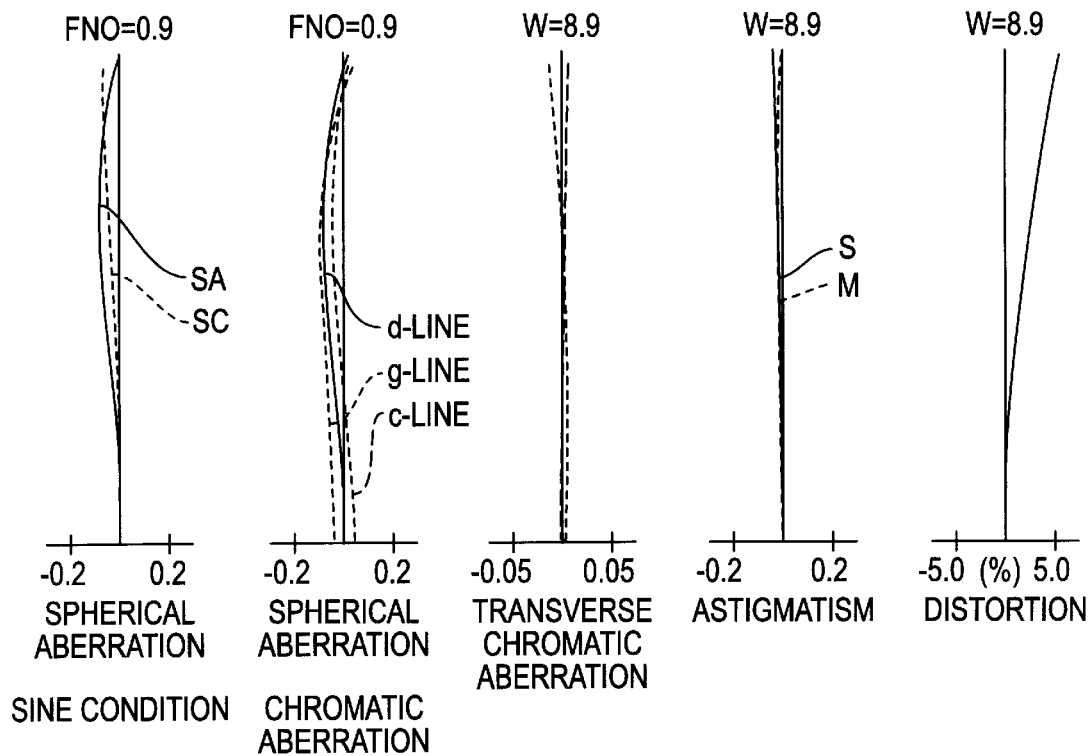
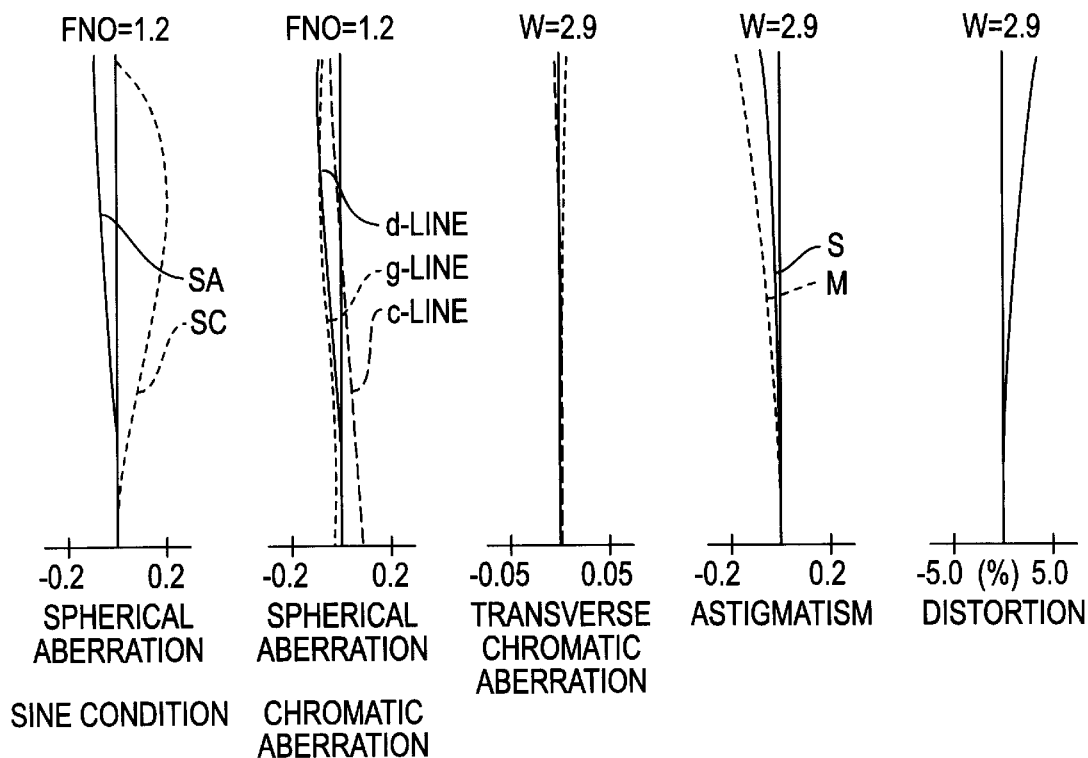

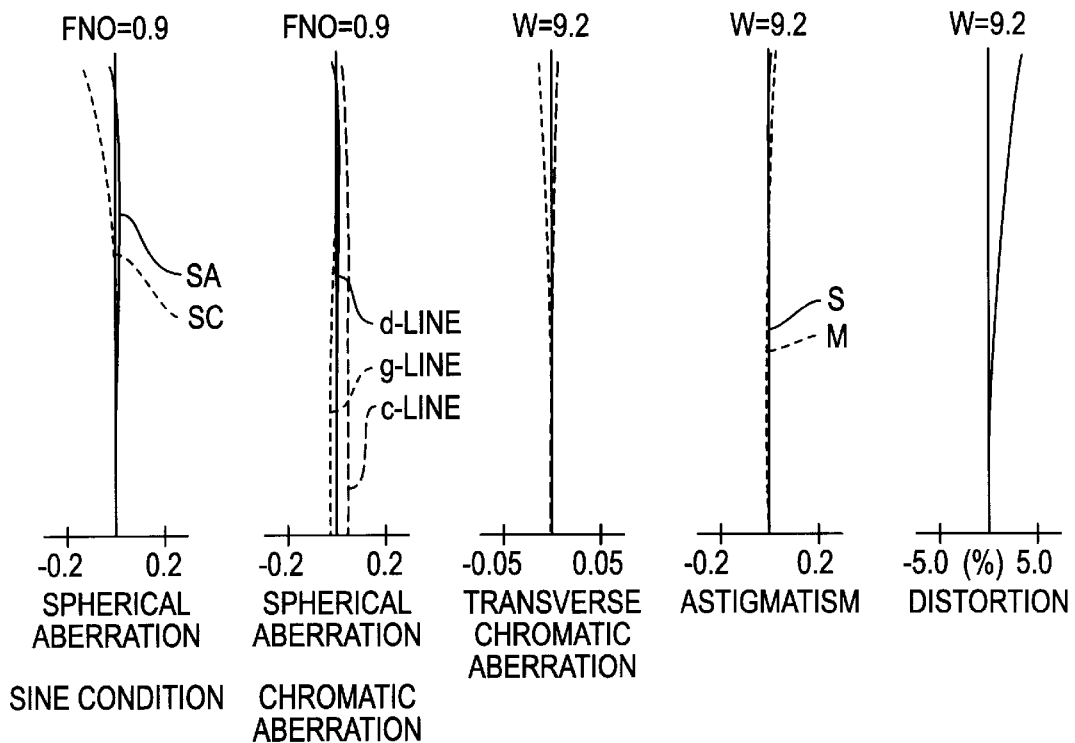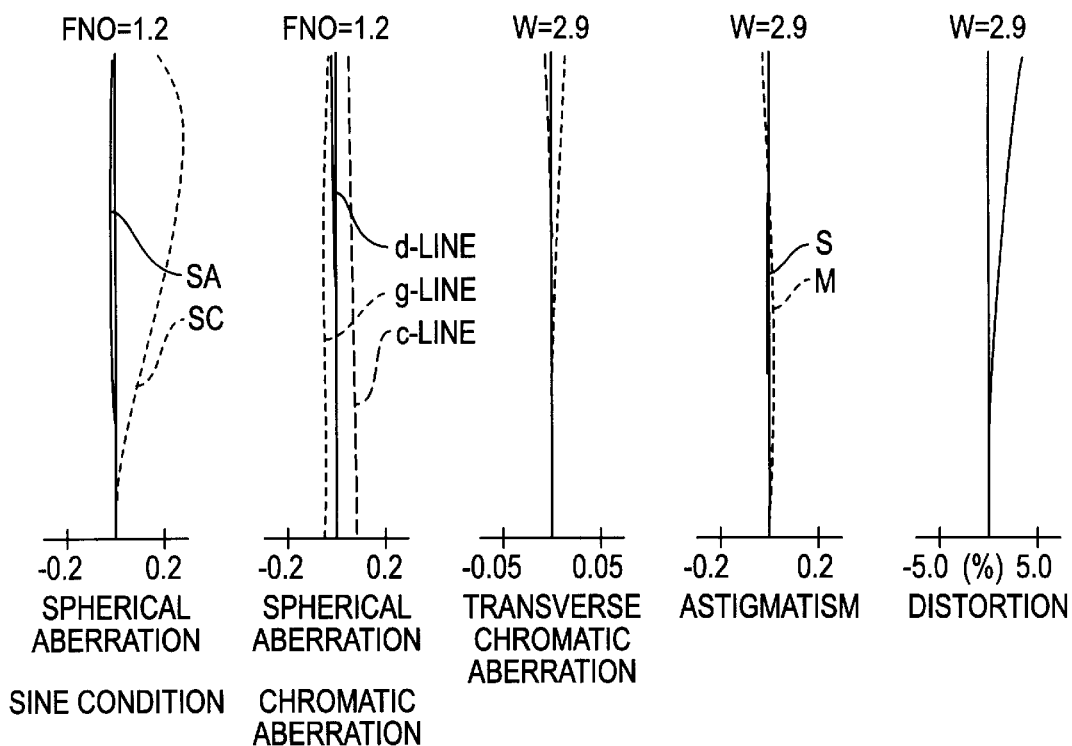

FNO=0.9

-0.2  0.2
SPHERICAL
ABERRATION
SINE CONDITION

FNO=0.9

-0.2  0.2
SPHERICAL
ABERRATION
CHROMATIC
ABERRATION

W=28.1

-0.05  0.05
TRANSVERSE
CHROMATIC
ABERRATION

W=28.1

-0.2  0.2
ASTIGMATISM

W=28.1

-5.0 (%) 5.0
DISTORTION

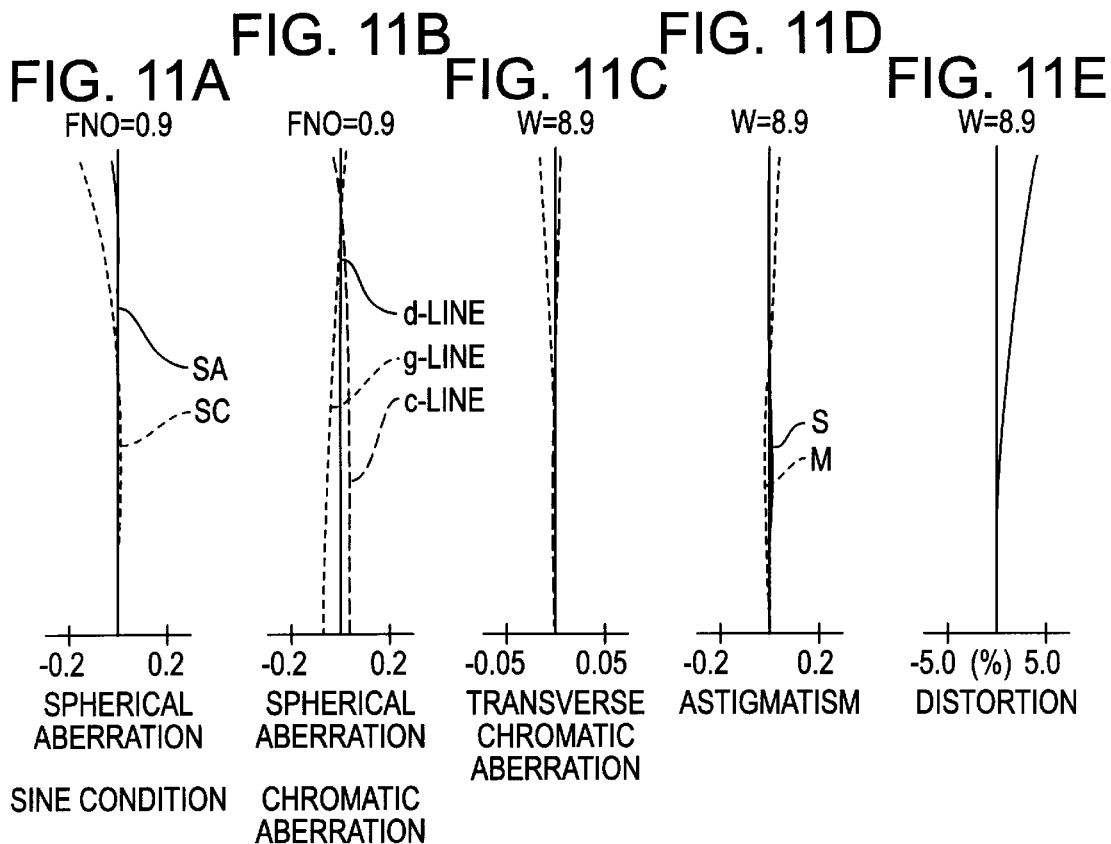
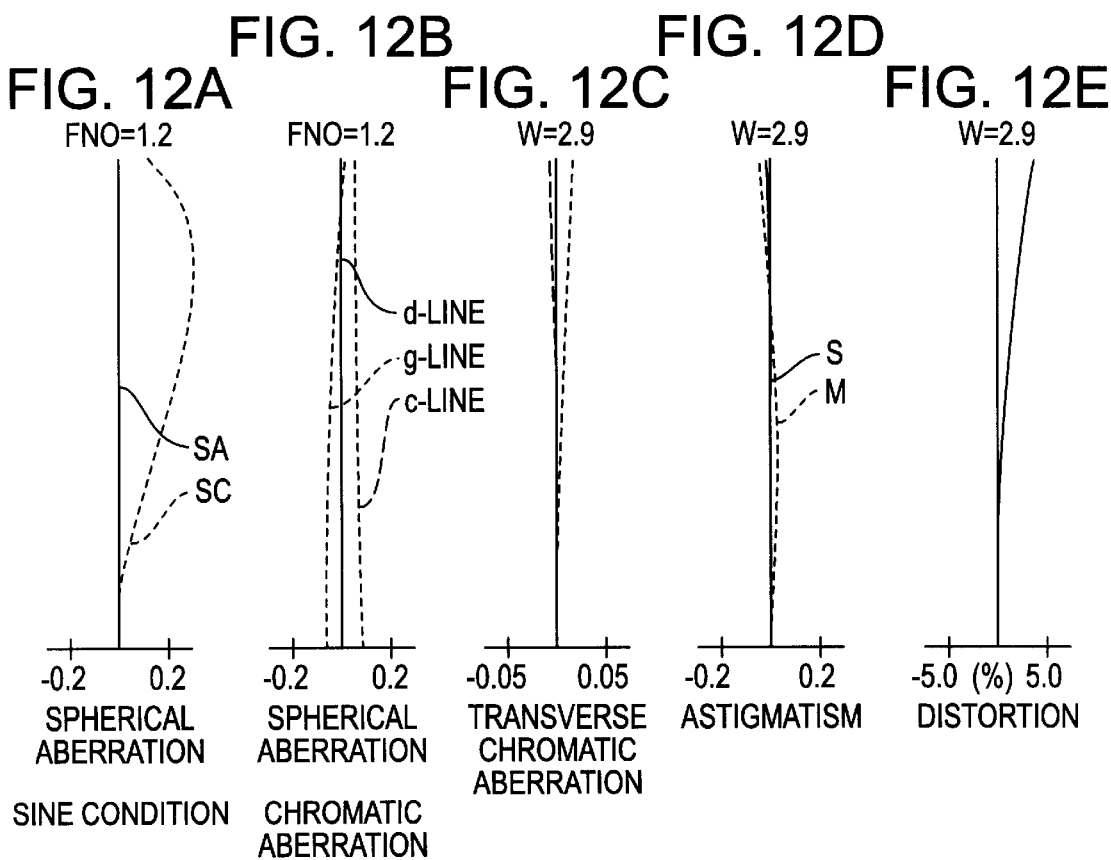

FAST ASPHERICAL ZOOM LENS SYSTEM

BACKGROUND OF THE INVENTION

1. Field of the Invention

The present invention relates to a fast aspherical zoom lens system which can be applied to a small TV camera such as a CCTV camera.

2. Description of the Related Art

In recent small TV cameras in which attempts have been made to miniaturize the picture plane size thereof, a CCD (solid state imaging device) with a high resolution having a size of around 1/3" (inch, length of a diagonal of the CCD) is employed. To this end, a fast photographing lens having a small F-number is needed for the zoom lens. However, in spherical lens systems, the F-number at the short focal length extremity is in the range of F1.2 to F1.4 at the minimum.

There is known a zoom lens system using an aspherical lens, whose F-number at the short focal length extremity is in the range of F0.8 to F0.9. However, in the conventional zoom lens systems, an aspherical lens having a relatively large diameter is used. The large diameter aspherical lens is expensive.

SUMMARY OF THE INVENTION

It is an object of the present invention to provide an inexpensive fast aspherical zoom lens system which can be used for a small CCD TV camera using a CCD of around 1/3", and in which the F-number is relatively small, i.e., approximately in the range of F0.9 to F1.0.

To achieve the object mentioned above, according to the present invention, there is provided a fast aspherical zoom lens system. A first lens group having positive refracting power, a second lens group having negative refracting power, a third lens group having negative refracting power, and a fourth lens group having positive refracting power, are arranged in this order from the object side. At least one aspherical surface is in the first through fourth lens groups. The second and third lens groups are moved during zooming, the said aspherical surface is located at a position in which the following condition is satisfied (1) $H_{ASP}/H_{MAX} < 0.35$ wherein $H_{MAX}$ represents the height of the paraxial ray furthest from the optical axis at the long focal length extremity for all the lens surfaces, and $H_{ASP}$ represents the height of the paraxial ray to the aspherical surface at the long focal length extremity.

Preferably, the fast aspherical zoom lens system satisfies the following condition (2); : $5 < L_{F-ASP} f_w < 10$ wherein $L_{F-ASP}$ represents the distance between the first surface reckoned from the object side and the aspherical surface on the optical axis, and $f_w$ represents the focal length at the short focal length extremity.

Preferably, the fast aspherical zoom lens system according to claim 1, wherein it satisfies the following condition:

(3) $\Delta I_{ASP} < 0$ wherein $\Delta I_{ASP}$ represents an aberration factor of the aspherical term of the third-order spherical aberration factor of the aspherical lens when the focal length of the entire lens system at the short focal length extremity is normalized to be 1.0.

The aspherical surface can be practically located in the fourth lens group.

The present disclosure relates to subject matter contained in Japanese Patent Application No. 08-212653 (filed on Aug. 12, 1996) which is expressly incorporated herein by reference in its entirety.

BRIEF DESCRIPTION OF THE DRAWINGS

The invention will be described below in detail with reference to the accompanying drawings, in which;

FIGS. 3A, 3B, 3C, 3D and 3E are aberration diagrams of a lens system shown in FIG. 1 at an intermediate focal length extremity;

FIGS. 4A, 4B, 4C, 4D and 4E are aberration diagrams of a lens system shown in FIG. 1 at the long focal length extremity;

FIGS. 7A, 7B, 7C, 7D and 7E are aberration diagrams of a lens system shown in FIG. 5 at an intermediate focal length extremity;

FIGS. 8A, 8B, 8C, 8D and 8E are aberration diagrams of a lens system shown in FIG. 5 at the long focal length extremity;

FIGS. 11A, 11B, 11C, 11D and 11E are aberration diagrams of a lens system shown in FIG. 9 at an intermediate focal length extremity;

FIGS. 12A, 12B, 12C, 12D and 12E are aberration diagrams of a lens system shown in FIG. 9 at the long focal length extremity; and, FIG. 13 is a conceptual view showing tracks of movement of each lens group of a zoom lens system comprised of four lens groups, according to the present invention.

DESCRIPTION OF THE PREFERRED EMBODIMENT

Figure 13:
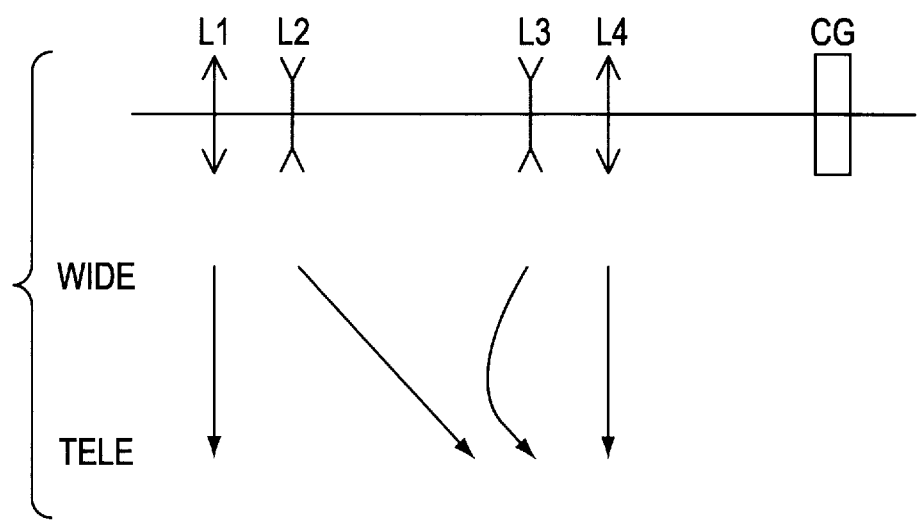

As may be seen in FIG. 13, a zoom lens system according to the present invention includes a first lens group L1 having positive refracting power, a second lens group L2 having negative refracting power (variator), a third lens group L3 having negative refracting power (compensator), and a fourth lens group L4 having positive refracting power. These lens groups L1 through L4 are arranged in this order from the object side. Upon zooming, the first and fourth lens groups L1 and L4 are stationary and the second and third lens groups L2 and L3 are moved. Namely, the magnification (power) is varied by the second lens group L2 and the correction is carried out by the third lens group L3. The focusing operation is carried out by the first lens group L1. In the present embodiment, the position of an aspherical lens which is incorporated in the zoom lens system is specified to reduce the manufacturing cost, increase the aperture size and enhance the performance thereof.

The condition (1) specifies the position of the aspherical surface. If an aspherical lens having the aspherical surface is located where the condition is satisfied, a small diameter aspherical lens can be used, reducing the manufacturing cost.

If the ratio defined in the condition (1) exceeds the limit, the aspherical lens becomes too large to sufficiently reduce of the manufacturing cost.

Further, if the aspherical lens is located at a position as specified in the condition (2), aspherical aberration, comatic aberration and astigmatism are well balanced.

If the aberrations of the fast lens whose F-number is approximately in the range of F0.8 to F0.9 is corrected by the spherical lenses only, positive and negative spherical aberrations (high-order aberrations) tend to occur at the intermediate peripheral portions of the fast lens, respectively. To correct the spherical aberrations by the aspherical surface, it is preferable that the aspherical surface is made of a diverging surface, that is, the aspherical surface has a power which varies in the negative direction from the center portion toward the peripheral portion.

If the ratio defined in the condition (2) is equal to or larger than the upper limit, the total length of the lens is unacceptably long. If the ratio defined in the condition (2) is equal to or smaller than the lower limit, astigmatism cannot be effectively corrected by the aspherical surface.

If the conditions defined by the condition (3) is satisfied, the spherical aberration of the fast lens can be effectively corrected. If the ratio exceeds the upper limit, it is impossible to effectively correct the spherical aberrations of the fast lens whose F-number is in the range of approximately F0.8 to F0.9.

The amount of variation in the coefficient of the third order aberration due to the aspheric surface will now be described. The shape of the aspheric surface can be generally expressed as follows.

$$X = CY^2/[1+\{1-(1+k)C^2Y^2\}^{1/2}] + A4Y^4 + A6Y^6 + A8Y^8 + A10Y^{10} + \ldots$$

wherein, Y represents a height above the axis,
 X represents a distance from a tangent plane of an aspherical vertex,
 C represents a curvature of the aspherical vertex (1/r),
 k represents a conic constant,
 A4 represents a fourth-order aspherical aberration factor,
 A6 represents a sixth-order aspherical aberration factor,
 A8 represents a eighth-order aspherical aberration factor; and
 A10 represents a tenth-order aspherical aberration factor.

In this equation, to obtain the coefficient of the aberration, the following replacement is done to transform K to "0" (Bi=Ai when K=0).
B4=A4+Kc³/8
B6=A6+(K²+2K)c⁵/16
B8=A8+5(K³+3K²+3K)c⁷/128
B10=A10+7(K⁴+4K³+6K²+4K)c⁹/256

Then, the following equation is obtained.

$$X = CY^2/[1+\{1-C^2Y^2\}^{1/2}] + B4Y^4 + B6Y^6 + B8Y^8 + B10Y^{10} + \ldots$$

When the focal length f is normalized to be 1.0, the resultant value is transformed as follows. Namely, substitute the following equations into the above equation:

$$X = x/f, \ Y = y/f, \ C = f \cdot c$$

$$\alpha4 = f^3 B4, \ \alpha6 = f^5 B6, \ \alpha8 = f^7 B8, \ \alpha10 = f^9 B10$$

In this way, the following equation is obtained.

$$X = CY^2/[1+\{1-C^2Y^2\}^{1/2}] + \alpha4 Y^4 + \alpha6 Y^6 + \alpha8 Y^8 + \alpha10 Y^{10} + \ldots$$

The second and subsequent terms define the amount of asphericity of the aspheric surface.

The relationship between the coefficient $\alpha4$ of the second term and the coefficient of the third-order aspheric surface $\Phi$ is expressed by:

$$\Phi = 8(N'-N)\alpha4$$

wherein N is the refractive index of a material nearer the object side with regard to the aspherical surface, and N' is the refractive index of a material behind the aspherical surface.

The coefficient of the aspherical surface $\Phi$ provides the following amounts of variation in the coefficients of the various kinds of third-order aberration.

$$\Delta I = h^4 \Phi$$

$$\Delta II = h^3 k \Phi$$

$$\Delta III = h^2 k^2 \Phi$$

$$\Delta IV = h^2 k^2 \Phi$$

$$\Delta V = h k^3 \Phi$$

wherein I is the spherical aberration coefficient,
 II is the coma coefficient,
 III is the astigmatism coefficient,
 IV is the curved surface coefficient of an aspherical image absent surface,
 V is a distortion coefficient,
 h is the height of paraxial rays passing through each lens surface; and
 k is the height of off-axis rays passing through the center of the pupil and each lens surface.

Numerical examples of the zoom lens system of the present invention will be discussed below.

<EMBODIMENT 1>

Figure 1:
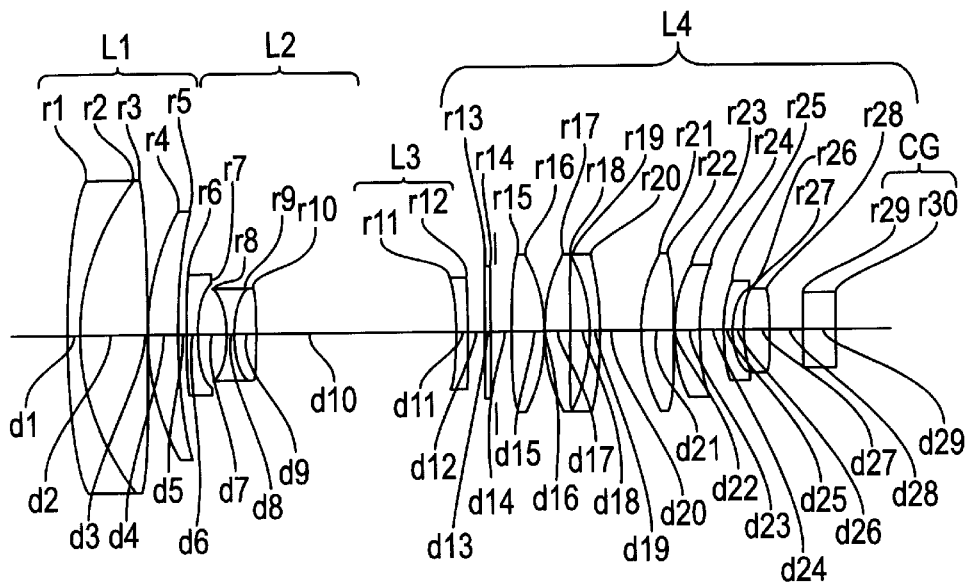
FIG. 1 is a schematic view showing the lens arrangement of a first embodiment of a fast aspherical zoom lens system according to the present invention.
Figures 2A, 2B, 2C, 2D, 2E:
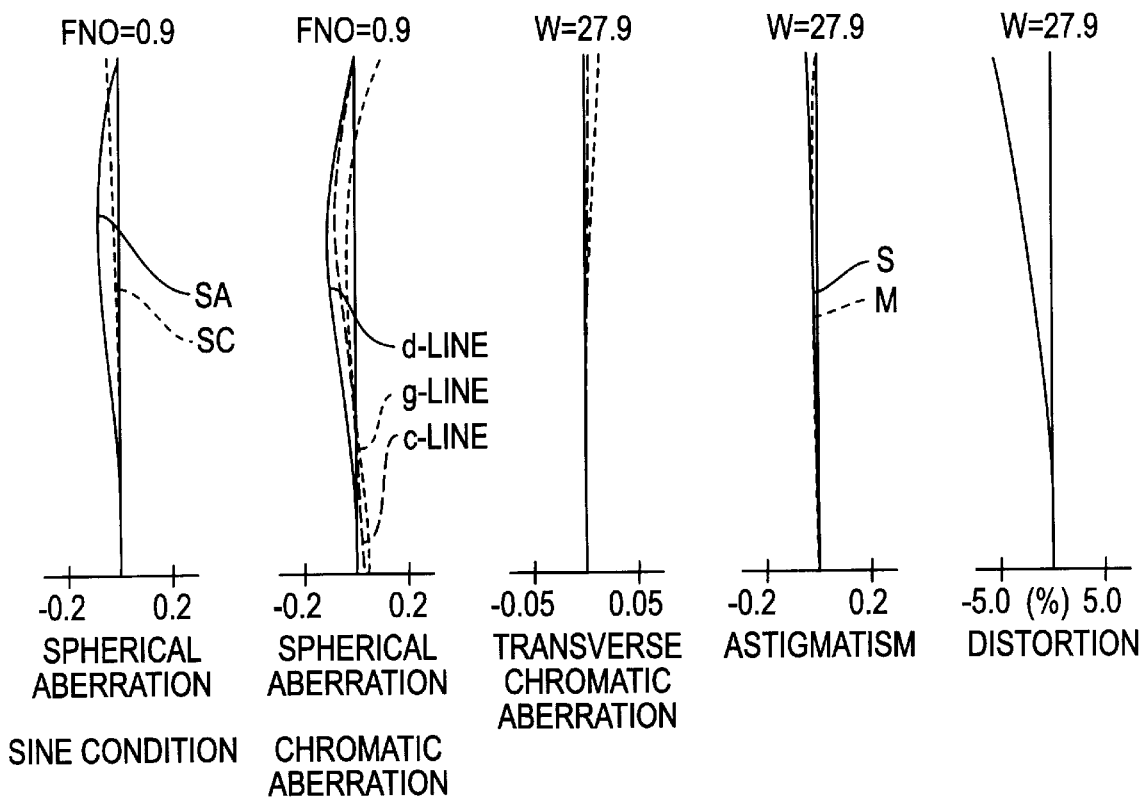
FIGS. 2A, 2B, 2C, 2D and 2E are aberration diagrams of a lens system shown in FIG. 1 at the short focal length extremity.

FIG. 1 shows a lens arrangement of a fast aspherical zoom lens system according to the present invention, and FIGS. 2A–2E, 3A–3E and 4A–4E show aberration diagrams of the zoom lens system shown in FIG. 1, at the short focal length extremity, an intermediate focal length extremity and the long focal length extremity, respectively. In the first embodiment, the lens system includes of four lens groups consisting of a first lens group L1 having positive refracting power, a second lens group L2 having negative refracting power, a third lens group L3 having negative refracting power, and a fourth lens group L4 having positive refracting power. These lens groups L1 through L4 are arranged in this order from the object side. There is a glass cover CG of the CCD (solid state imaging device) provided behind the fourth lens group L4.

Numerical data of the lens system is shown in Table 1 below. In the aberration diagrams, d-line, g-line and C-line represent the chromatic aberrations represented by spherical aberrations and lateral chromatic aberrations at the respective wavelengths, SA represents the spherical aberrations, SC represents the sine conditions, S represents the Sagittal rays, and M represents the Meridional rays, respectively.

In the following tables and drawings, FNO designates the F-number, f the focal length, W the half angle of view, fB the back focal distance (reduced distance between the last surface of the fourth lens group and the CCD image pickup surface, i.e., the last surface of the glass cover), R the radius of curvature, D the distance between the lenses, Nd the refractive index of the d-line, and υd the Abbe number of the d-line, respectively.

TABLE 1

FNO = 1:0.9–0.9–1.2
f = 5.98–18.37–56.38
W = 27.9–8.9–2.9
fB = 5.21 + 5.70/1.49782 = 9.02 (reduced back focal distance)

| Surface No. | R | D | Nd | νd |
|---|---|---|---|---|
| 1 | 121.500 | 2.00 | 1.80518 | 25.4 |
| 2 | 44.435 | 11.00 | 1.60311 | 60.7 |
| 3 | −237.774 | 0.10 | — | — |
| 4 | 46.311 | 5.70 | 1.77250 | 49.6 |
| 5 | 206.715 | 1.00–22.39–33.40 | — | — |
| 6 | 94.860 | 1.50 | 1.80400 | 46.6 |
| 7 | 15.117 | 5.08 | — | — |
| 8 | −19.750 | 1.50 | 1.77250 | 49.6 |
| 9 | 15.142 | 3.70 | 1.84666 | 23.8 |
| 10 | −176.700 | 34.29–8.48–4.20 | — | — |
| 11 | −25.970 | 1.50 | 1.72916 | 54.7 |
| 12 | −140.152 | 3.13–7.55–0.82 | — | — |
| 13 | ∞ | 0.50 | 1.51633 | 64.1 |
| 14 | ∞ | 1.00 | — | — |
| Diaphragm | ∞ | 2.80 | — | — |
| 15 | 116.842 | 5.40 | 1.69680 | 55.5 |
| 16 | −29.250 | 0.10 | — | — |
| 17 | 29.920 | 4.30 | 1.48749 | 70.2 |
| 18 | ∞ | 3.25 | — | — |
| 19 | −27.188 | 1.70 | 1.84666 | 23.8 |
| 20 | −69.476 | 7.59 | — | — |
| 21 | 31.342 | 4.70 | 1.58913 | 61.2 |
| 22 | −210.000 | 0.10 | — | — |
| 23 | 16.160 | 4.60 | 1.48749 | 70.2 |
| 24 | 32.648 | 4.08 | — | — |
| 25 | 22.419 | 1.40 | 1.84666 | 23.8 |
| 26 | 10.000 | 1.37 | — | — |
| 27* | 13.765 | 5.70 | 1.66625 | 55.2 |
| 28 | −51.786 | 5.21 | — | — |
| 29 | ∞ | 5.70 | 1.49782 | 66.8 |
| 30 | ∞ | — | — | — |

*designates an aspherical surface.
Aspherical data
No. 27; K = 0.00, A4 = −0.39130 × 10⁻⁴, A6 = −0.41090 × 10⁻⁶ A8 = 0.41830 × 10⁻⁸, A10 = −0.35520 × 10⁻¹⁰, A12 = 0.00

<EMBODIMENT 2>

Figure 5:
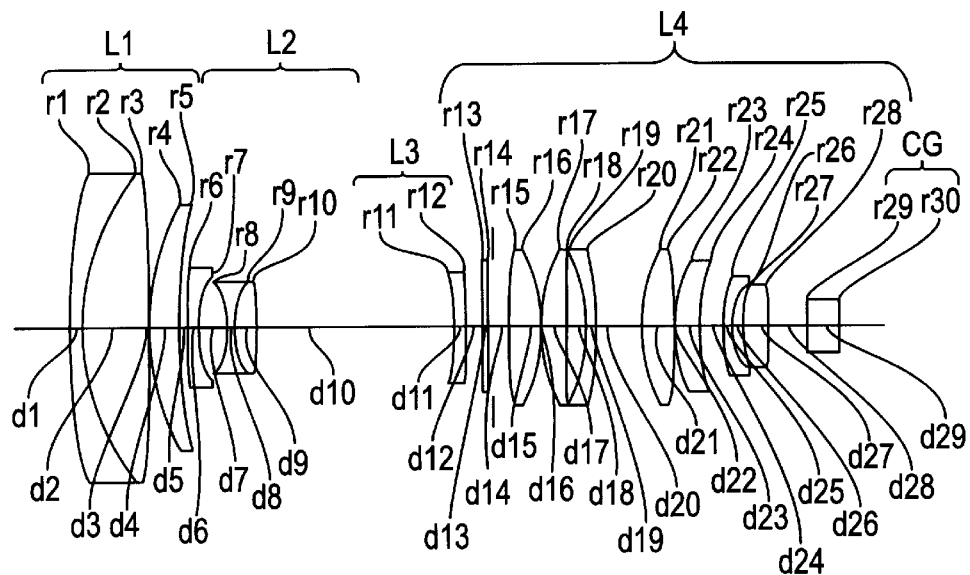
FIG. 5 is a schematic view showing the lens arrangement of a second embodiment of a fast aspherical zoom lens system according to the present invention.
Figures 6A, 6B, 6C, 6D, 6E:
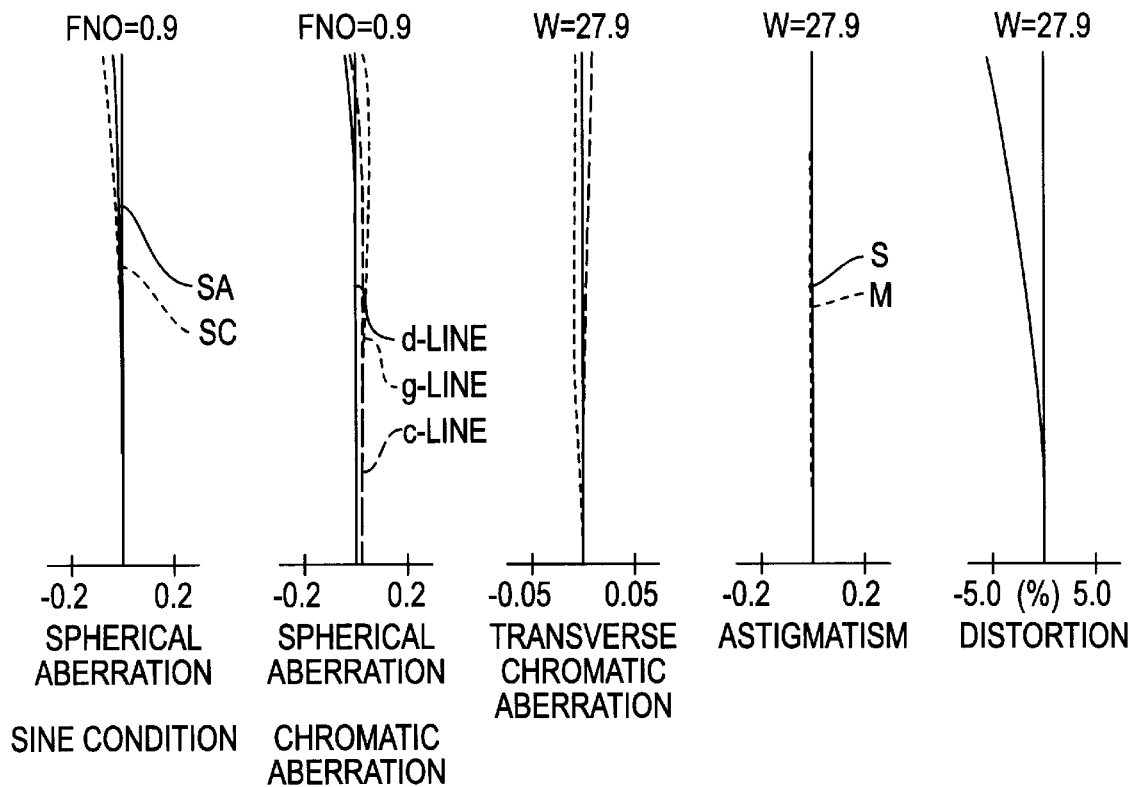
FIGS. 6A, 6B, 6C, 6D and 6E are aberration diagrams of a lens system shown in FIG. 5 at the short focal length extremity.

FIGS. 5 through 8E show a second embodiment of a fast aspherical zoom lens of the present invention. FIG. 5 shows a lens arrangement thereof, and FIGS. 6A–6E, 7A–7E and 8A–8E show aberration diagrams of the zoom lens system shown in FIG. 5, at the short focal length extremity, an intermediate focal length extremity and the long focal length extremity, respectively. Numerical data of the second embodiment of the lens system is shown in Table 2 below.

TABLE 2

FNO = 1:0.9–0.9–1.2
f = 5.97–17.97–56.40
W = 27.9–9.2–2.9
fB = 5.73 + 5.70/1.49782 = 9.54 (reduced back focal distance)

| Surface No. | R | D | Nd | νd |
|---|---|---|---|---|
| 1 | 119.686 | 2.00 | 1.80518 | 25.4 |
| 2 | 47.086 | 11.00 | 1.60311 | 60.7 |

TABLE 2-continued

FNO = 1:0.9–0.9–1.2
f = 5.97–17.97–56.40
W = 27.9–9.2–2.9
fB = 5.73 + 5.70/1.49782 = 9.54 (reduced back focal distance)

| Surface No. | R | D | Nd | νd |
|---|---|---|---|---|
| 3 | −261.938 | 0.10 | — | — |
| 4 | 44.168 | 5.83 | 1.77250 | 49.6 |
| 5 | 151.587 | 0.90–22.12–33.67 | — | — |
| 6 | 61.389 | 1.50 | 1.80400 | 46.6 |
| 7 | 14.495 | 5.08 | — | — |
| 8 | −20.090 | 1.50 | 1.77250 | 49.6 |
| 9 | 17.012 | 3.70 | 1.84666 | 23.8 |
| 10 | −521.517 | 34.37–8.96–2.91 | — | — |
| 11 | −24.077 | 1.50 | 1.72916 | 54.7 |
| 12 | −143.563 | 3.09–7.28–1.78 | — | — |
| 13 | ∞ | 0.50 | 1.51633 | 64.1 |
| 14 | ∞ | 1.00 | — | — |
| Diaphragm | ∞ | 2.80 | — | — |
| 15 | 162.914 | 5.80 | 1.69680 | 55.5 |
| 16 | −25.889 | 0.10 | — | — |
| 17 | 33.448 | 4.30 | 1.48749 | 70.2 |
| 18 | 13093.563 | 3.36 | — | — |
| 19 | −23.722 | 1.70 | 1.84666 | 23.8 |
| 20 | −56.630 | 7.59 | — | — |
| 21 | 27.856 | 5.76 | 1.58913 | 61.2 |
| 22 | −125.505 | 0.10 | — | — |
| 23 | 17.183 | 4.60 | 1.48749 | 70.2 |
| 24 | 30.732 | 4.08 | — | — |
| 25* | 18.621 | 1.40 | 1.84666 | 23.8 |
| 26 | 10.088 | 1.46 | — | — |
| 27 | 17.558 | 5.70 | 1.69680 | 55.5 |
| 28 | −73.408 | 5.73 | — | — |
| 29 | ∞ | 5.70 | 1.49782 | 66.8 |
| 30 | ∞ | — | — | — |

*designates an aspherical surface.
Aspherical data;
No. 25; K = 0.00, A4 = −0.25802 × 10⁻⁴, A6 = −0.22055 × 10⁻⁷, A8 = −0.40327 × 10⁻⁹, A10 = −0.18850 × 10⁻¹¹, A12 = 0.00

<EMBODIMENT 3>

Figure 9:
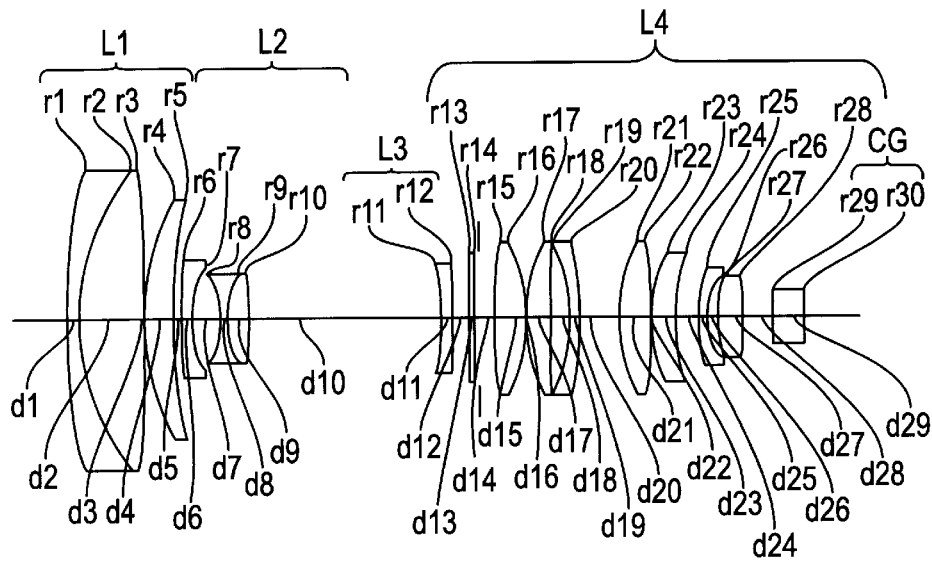
FIG. 9 is a schematic view showing the lens arrangement of a third embodiment of a fast aspherical zoom lens system according to the present invention.
Figure 10A:
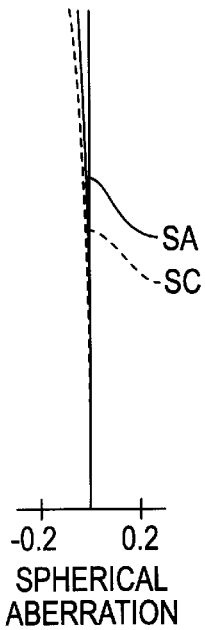
FIGS. 10A, 10B, 10C, 10D and 10E are aberration diagrams of a lens system shown in FIG. 9 at the short focal length extremity.
Figure 10B:
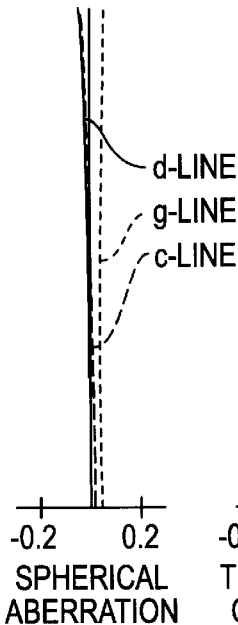
Figure 10C:
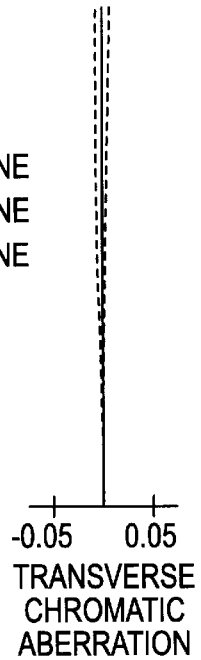
Figure 10D:
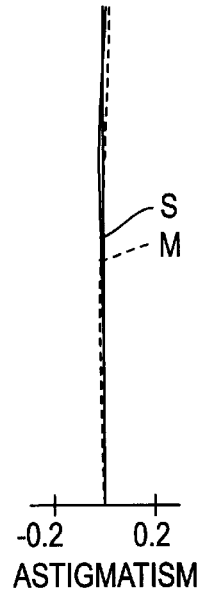
Figure 10E:
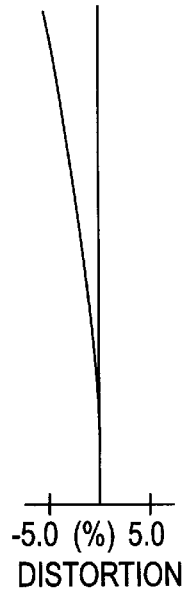

FIGS. 9 through 12E show a third embodiment of a fast aspherical zoom lens of the present invention. FIG. 9 shows a lens arrangement thereof, and FIGS. 10A–10E, 11A–11E and 12A–12E show aberration diagrams of the zoom lens system shown in FIG. 9, at the short focal length extremity, an intermediate focal length extremity and the long focal length extremity, respectively. Numerical data of the third embodiment of the lens system is shown in Table 3 below.

TABLE 3

FNO = 1:0.9–0.9–1.2
f = 5.97–18.41–56.80
W = 28.1–8.9–2.9
fB = 4.92 + 0.70/1.49782 = 8.73 (reduced back focal distance)

| Surface No. | R | D | Nd | νd |
|---|---|---|---|---|
| 1 | 115.143 | 2.00 | 1.80518 | 25.4 |
| 2 | 45.488 | 11.00 | 1.60311 | 60.7 |
| 3 | −286.279 | 0.10 | — | — |
| 4 | 45.180 | 5.70 | 1.77250 | 49.6 |
| 5 | 178.536 | 1.00–22.39–33.39 | — | — |
| 6 | 87.668 | 1.50 | 1.80400 | 46.6 |
| 7 | 15.400 | 5.08 | — | — |
| 8 | −20.714 | 1.50 | 1.77250 | 49.6 |
| 9 | 16.928 | 3.70 | 1.84666 | 23.8 |
| 10 | −395.120 | 34.30–8.48–4.23 | — | — |
| 11 | −26.889 | 1.50 | 1.72916 | 54.7 |
| 12 | −180.438 | 3.13–7.56–0.80 | — | — |
| 13 | ∞ | 0.50 | 1.51633 | 64.1 |

TABLE 3-continued

FNO = 1:0.9–0.9–1.2  
f = 5.97–18.41–56.80  
W = 28.1–8.9–2.9  
fB = 4.92 + 0.70/1.49782 = 8.73 (reduced back focal distance)

| Surface No. | R | D | Nd | νd |
|---|---|---|---|---|
| 14 | ∞ | 1.00 | — | — |
| Diaphragm | ∞ | 2.80 | — | — |
| 15 | 138.372 | 5.40 | 1.69680 | 55.5 |
| 16 | −27.374 | 0.10 | — | — |
| 17 | 30.972 | 4.30 | 1.48749 | 70.2 |
| 18 | −2288.686 | 3.25 | — | — |
| 19 | −26.058 | 1.70 | 1.84666 | 23.8 |
| 20 | −61.063 | 7.59 | — | — |
| 21 | 29.575 | 4.70 | 1.58913 | 61.2 |
| 22 | −296.899 | 0.10 | — | — |
| 23 | 16.370 | 4.60 | 1.48749 | 70.2 |
| 24 | 30.245 | 4.08 | — | — |
| 25 | 20.774 | 1.40 | 1.84666 | 23.8 |
| 26* | 10.099 | 1.37 | — | — |
| 27 | 15.410 | 5.70 | 1.69680 | 55.5 |
| 28 | −49.051 | 4.92 | — | — |
| 29 | ∞ | 5.70 | 1.49782 | 66.8 |
| 30 | ∞ | — | — | — |

*Designates an aspherical surface.  
Aspherical data;  
No. 26; K = 0.00, A4 = 0.39268 × 10$^{-4}$, A6 = 0.65465 × 10$^{-7}$, A8 = −0.71951 × 10$^{-9}$, A10 = 0.57682 × 10$^{-10}$, A12 = 0.00

Values of the ratios defined in the inequalities (1) through (3) for each embodiment are shown in Table 4 below.

TABLE 4

|  | Embodiment 1 | Embodiment 2 | Embodiment 3 |
|---|---|---|---|
| Formula (1) | 0.21 | 0.25 | 0.21 |
| Formula (2) | 6.45 | 6.26 | 6.23 |
| Formula (3) | −0.73 | −1.24 | −0.97 |

As can be seen from Table 4, the numerical values of the first through third embodiments satisfy conditions (1) through (3).

According to the present invention, a fast aspherical zoom lens system whose F-number at the short focal length extremity is in the range of approximately 0.9 to 1.0 can be obtained at a low manufacturing cost.

What is claimed is:

1. A fast aspherical zoom lens system comprising a first lens group having positive refracting power, a second lens group having negative refracting power, a third lens group having negative refracting power, and a fourth lens group having positive refracting power, arranged in this order from the object side, and further comprising at least one aspherical surface in said first through fourth lens groups, said second and third lens groups being moved during zooming, wherein said aspherical surface is located at a position in which the following conditions is satisfied:

$$H_{ASP}/H_{MAX} < 0.35$$

$$5 < L_{F\text{-}ASP}/f_w < 10$$

wherein $H_{MAX}$ represents the height of the paraxial ray furthest from the optical axis at the long focal length extremity for all lens surfaces, $H_{ASP}$ represents the height of the paraxial ray to the aspherical surface at the long focal length extremity, $L_{F\text{-}ASP}$ represents the distance between the first surface at the object side and the aspherical surface, along the optical axis, and $f_w$ represents the focal length at the short focal length extremity.

2. A fast aspherical zoom lens system according to claim 1, wherein the zoom lens system satisfies the following condition:

$$\Delta I_{ASP} < 0$$

wherein $\Delta I_{ASP}$ represents an aberration factor of the aspherical term of the third-order spherical aberration factor of the aspherical lens when the focal length of the entire lens system at the short focal length extremity is normalized to be 1.0.

3. A fast aspherical zoom lens system according to claim 1, wherein said aspherical surface is located in the fourth lens group.

* * * * *